United States Patent
Feng et al.

(10) Patent No.: US 11,231,936 B2
(45) Date of Patent: Jan. 25, 2022

(54) FIRMWARE BOOT IMPLEMENTATION METHOD BASED ON FLASH CHIP SIMULATION CONNECTED TO A MASTER MICROCONTROLLER UNIT (MCU) AND SLAVE MCU

(71) Applicant: YEALINK (XIAMEN) NETWORK TECHNOLOGY CO., LTD., Fujian (CN)

(72) Inventors: Wanjian Feng, Fujian (CN); Lianchang Zhang, Fujian (CN); Zhaoyang Luo, Fujian (CN); Bingyang Zeng, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 25 days.

(21) Appl. No.: 16/836,241

(22) Filed: Mar. 31, 2020

(65) Prior Publication Data

US 2020/0326954 A1    Oct. 15, 2020

(30) Foreign Application Priority Data

Apr. 11, 2019 (CN) .......................... 201910288563.8

(51) Int. Cl.
   *G06F 9/4401* (2018.01)
   *G06F 1/28* (2006.01)
   *G06F 3/06* (2006.01)

(52) U.S. Cl.
   CPC .............. *G06F 9/4406* (2013.01); *G06F 1/28* (2013.01); *G06F 3/0604* (2013.01); *G06F 3/0659* (2013.01); *G06F 3/0679* (2013.01)

(58) Field of Classification Search
   CPC ........ G06F 9/4406; G06F 1/28; G06F 3/0604; G06F 3/0659; G06F 3/0679
   See application file for complete search history.

(56) References Cited

U.S. PATENT DOCUMENTS

| 10,782,770 | B2 * | 9/2020 | Wang | G06F 1/3203 |
| 10,997,298 | B2 * | 5/2021 | Asano | G06F 9/4401 |
| 2007/0186092 | A1 * | 8/2007 | Uemura | G06F 15/177 713/2 |

* cited by examiner

*Primary Examiner* — Tammara R Peyton

(57) ABSTRACT

The embodiments of the present disclosure disclose a firmware boot implementation method based on Flash chip simulation, the method comprising: when there are at least two MCUs, one of the MCUs is selected as a master MCU and each remaining MCU is as slave MCU which is connected with the master MCU respectively, and the master MCU is connected with a Flash chip; when the master MCU is started, the master MCU is started by reading firmware data in the Flash chip; when the slave MCU is started, the master MCU controls the slave MCU to be powered on, and the slave MCU sends a request for reading the firmware data to the master MCU; the master MCU transmits the request to the Flash chip, and transmits the firmware data returned by the Flash chip to the slave MCU, so as to start the slave MCU.

6 Claims, 3 Drawing Sheets

FIRMWARE BOOT IMPLEMENTATION METHOD BASED ON FLASH CHIP SIMULATION CONNECTED TO A MASTER MICROCONTROLLER UNIT (MCU) AND SLAVE MCU

CROSS-REFERENCE TO RELATED APPLICATIONS

The present application claims the benefit of Chinese Patent Application No. 201910288563.8 filed on Apr. 11, 2019, the contents of which are hereby incorporated by reference.

FIELD OF THE DISCLOSURE

The present disclosure relates to chip area and is more particularly concerned with a firmware boot implementation method based on Flash chip simulation.

BACKGROUND OF THE DISCLOSURE

There are two ways to start MCU (Microcontroller Unit), one is to operate directly from the firmware on the MCU, and the other is to operate after dynamically booting and loading firmware. The traditional way is to mount a Flash chip outside the MCU. When the system is relatively simple and only has one MCU, it is needed to mount one Flash chip. When the system is relatively complex and has multiple MCUs to work, it is needed to mount the same number of Flash chips outside the MCUs. Since one MCU is mounted with one Flash chip, the system loaded with multiple MCUs needs to be mounted with multiple Flash chips. In fact, the actual utilization of every Flash chip is not high, and lots of storage space is not utilized, which renders the problems of resources waste, circuit complexity and cost increase, etc.

SUMMARY OF THE DISCLOSURE

To solve the above problems, the present disclosure provides a firmware boot implementation method based on Flash chip simulation, which can simplify circuit, save space and reduce cost.

Based on this, the prevent disclosure provides a firmware boot implementation method based on Flash chip simulation. The method comprises:

when there are at least two MCUs, one of the MCUs is selected as a master MCU and each remaining MCU is as slave MCU which is connected with the master MCU respectively, and the master MCU is connected with a Flash chip;

when the master MCU is started, the master MCU is kept in a power-on state, the slave MCU is kept in a power-off state, and the master MCU is started by reading firmware data in the Flash chip;

when the slave MCU is started, the master MCU controls the slave MCU to be powered on, and the slave MCU sends a request for reading the firmware data to the master MCU; and the master MCU transmits the request for reading the firmware data from the slave MCU to the Flash chip, and the master MCU transmits the firmware data returned by the Flash chip to the slave MCU, so as to start the slave MCU.

Wherein, the method is applied to start the MCU that needs to be operated after dynamically booting and loading firmware.

Wherein, the firmware data comprises addresses and sizes of the MCUs' firmware set in the Flash chip.

Wherein, the firmware data of the master MCU and the slave MCU is pre-stored in the Flash chip, and the storage locations thereof in the Flash chip are different.

Wherein, the addresses of the firmware data are determined by boot codes fixed in the MCUs.

Wherein, the request for reading firmware data comprises writing, erasing or reading out the data.

Wherein, the firmware data is burned into the Flash chip, and the firmware data comprises startup codes.

The Flash chip in the present disclosure has a larger storage space and one Flash chip can be used by multiple MCUs, thereby maximizing resource utilization, reducing costs and simplifying circuit.

BRIEF DESCRIPTION OF DRAWINGS

To illustrate the technical solutions in the embodiments of the present disclosure or the prior art more clearly, the following briefly introduces the accompanying drawings required for describing the embodiments or the prior art. Apparently, the accompanying drawings in the following description show merely some embodiments of the present disclosure, and a person of ordinary skill in the art may readily derive other drawings from these accompanying drawings without creative efforts.

DETAILED DESCRIPTION OF ILLUSTRATED EMBODIMENTS

In the following, the technical solutions in the embodiments of the present disclosure will be clearly and completely described with reference to the drawings in the embodiments of the present disclosure. Apparently, the described embodiments are merely a part of the embodiments of the present disclosure, but not all embodiments. Based on the embodiments of the present disclosure, all other embodiments obtained by a person of ordinary skill in the art without creative efforts shall fall within the protection scope of the present disclosure.

Figure 1:
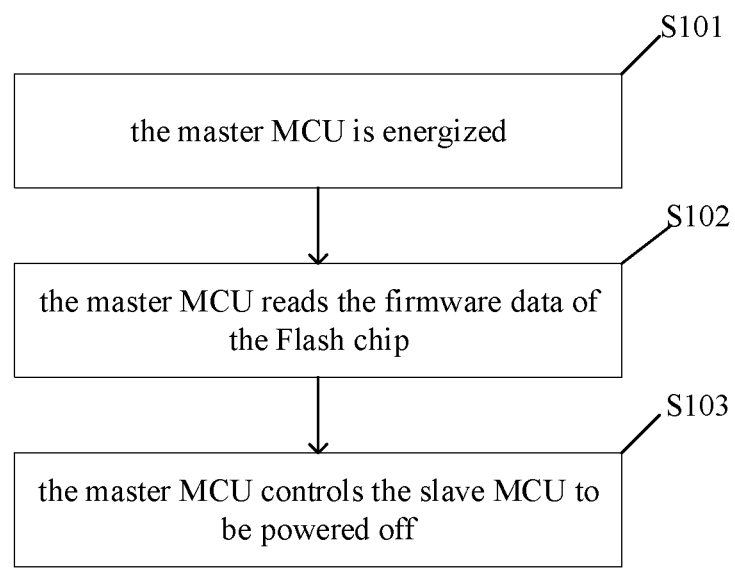
FIG. 1 is a startup flowchart of the master MCU in the firmware boot implementation method based on Flash chip simulation provided by the embodiments of the prevent disclosure.

FIG. 1 is a startup flowchart of the master MCU in the firmware boot implementation method based on Flash chip simulation provided by the embodiments of the prevent disclosure. The startup of the master MCU comprises:

S101, the master MCU is energized.

MCU, i.e. Microcontroller Unit, also known as Single Chip Microcomputer or Microcontroller, is a chip-level computer formed by appropriately reducing the frequency and specification of the CPU (Central Process Unit) and integrating peripheral interfaces, such as memory, timer, USB, A/D conversion, UART, PLC, DMA and even LCD drive circuit, on a single chip in order to make different combined control for different application scenarios.

When there are at least two MCUs in the circuit system, one of the MCUs is selected as a master MCU and each remaining MCU is as slave MCU which is connected with the master MCU respectively, and the master MCU is connected with a Flash chip;

When the master MCU is started, the master MCU is kept in a power-on state.

S102, the master MCU reads the firmware data of the Flash chip.

The Flash chip is a kind of memory chip, the data in which can be modified by specific program. Flash represents Flash Memory in electronics and semiconductors, and its full name is Flash EEPROM Memory.

The Flash chip is also known as Flash Memory, and it combines the advantages of ROM and RAM. The Flash chip not only has the electrically erasable and programmable performance, but also has the advantage of fast data reading, so that the data will not be lost due to power failure.

Firmware is the program written in EPROM (Erasable Programmable Read-Only Memory) or EEPROM (Electrically Erasable Programmable Read-Only Memory).

Firmware refers to device "driving program" stored in the device. Only by the firmware, the operating system can achieve the running operation of specific machine according to standard device driver. For example, optical disk driver, compact disc recordable, etc. have internal firmware.

Firmware data is the program that drives the electronic system to operate. The firmware data comprises the addresses and sizes of the MCU firmware set in the Flash chip. The master MCU enters working state after reading the firmware data, i.e. the driving program, of the Flash chip.

S103, the master MCU controls the slave MCU to be powered off.

After reading the firmware data of the Flash chip, the master MCU controls the slave MCU to be powered off, so that the slave MCU can not send firmware data request to the master MCU. In this way, the electric energy can be saved.

Figure 2:
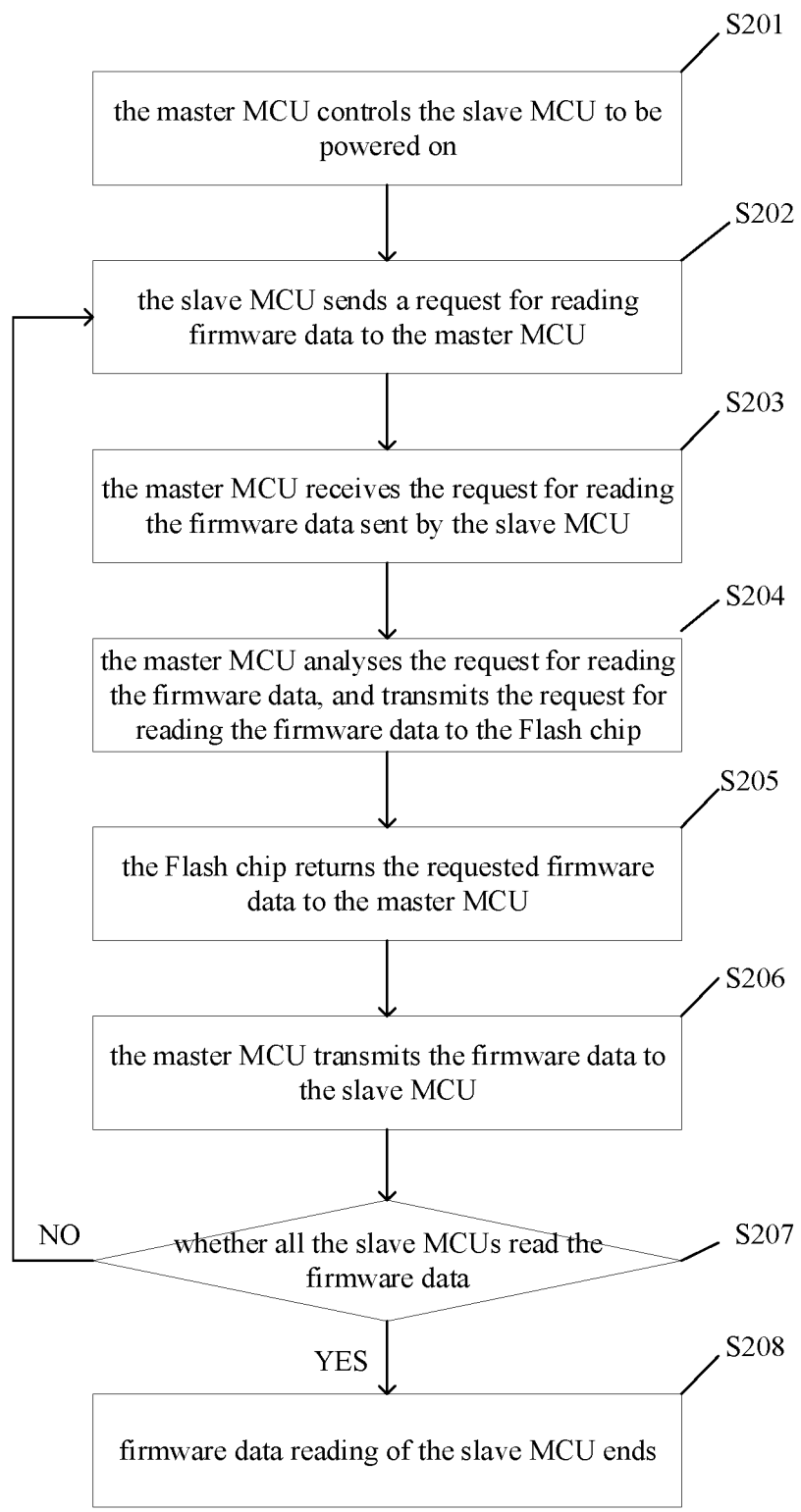
FIG. 2 is a startup diagram of the slave MCU in the firmware boot implementation method based on Flash chip simulation provided by the embodiments of the prevent disclosure.

FIG. 2 is a startup diagram of the slave MCU in the firmware boot implementation method based on Flash chip simulation provided by the embodiments of the prevent disclosure. The startup of the slave MCU comprises:

S201, the master MCU controls the slave MCU to be powered on.

After entering working state by reading the firmware data, i.e. the driving program, of the Flash chip, the master MCU controls the slave MCU to be powered on, so that the slave MCU can send firmware data request to the master MCU.

S202, the slave MCU sends a request for reading firmware data to the master MCU.

Wherein, the firmware data of the master MCU and the slave MCU is pre-stored in the Flash chip and the storage locations thereof in the Flash chip are different. The firmware data request comprises the storage addresses of the firmware data in the Flash chip.

S203, the master MCU receives the request for reading the firmware data sent by the slave MCU.

The master MCU functions as a transfer station in the process that the slave MCU acquires the firmware data. The slave MCU sends the request for reading the firmware data to the master MCU, and the master MCU receives the request for reading the firmware data.

S204, the master MCU transmits the request for reading the firmware data to the Flash chip.

The master MCU sends the request for reading the firmware data from the slave MCU to the Flash chip.

S205, the Flash chip returns the requested firmware data to the master MCU.

The Flash chip receives the request for reading the firmware data from the slave MCU transmitted by the master MCU. The firmware data request comprises the storage addresses of the firmware data in the Flash chip. The Flash chip extracts the firmware data according to the storage addresses of the firmware data in the Flash chip, and sends the firmware data to the master MCU.

S206, the master MCU transmits the firmware data to the slave MCU.

The master MCU receives the firmware data sent by the Flash chip, and sends the firmware data to the slave MCU that sends the request for reading the firmware data.

S207, whether all the slave MCUs read the firmware data is judged.

The slave MCU reads the firmware data sent by the master MCU and enters working state. Judging whether all the slave MCUs read the firmware data is to judge whether all the slave MCUs enter working state.

S208, firmware data reading of the slave MCU ends.

All the slave MCUs are started after reading the firmware data, that is, the firmware data reading of the slave MCU ends.

Figure 3:
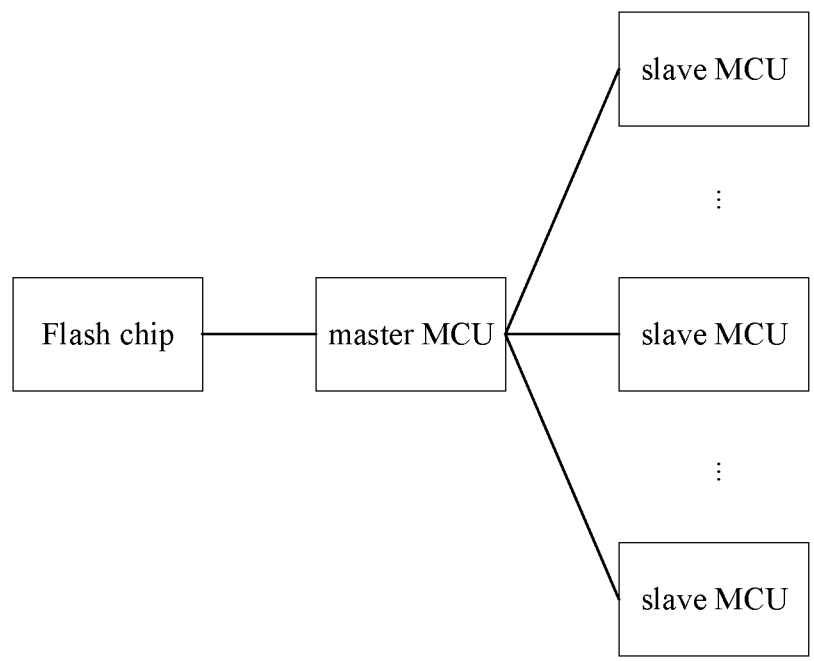
FIG. 3 is a diagram of the firmware boot implementation method based on Flash chip simulation provided by the embodiments of the prevent disclosure.

FIG. 3 is a diagram of the firmware boot implementation method based on Flash chip simulation provided by the embodiments of the prevent disclosure. The method comprises:

The master MCU is energized.

When there are at least two MCUs in the circuit system, one of the MCUs is selected as a master MCU and each remaining MCU is as slave MCU which is connected with the master MCU respectively, and the master MCU is connected with a Flash chip.

When the master MCU is started, the master MCU is kept in a power-on state.

The master MCU reads the firmware data of the Flash chip.

The master MCU controls the slave MCU to be powered off.

After reading the firmware data of the Flash chip, the master MCU controls the slave MCU to be powered off, so that the slave MCU can not send firmware data request to the master MCU. In this way, the electric energy can be saved.

The master MCU controls the slave MCU to be powered on.

After entering working state by reading the firmware data, i.e. the driving program, of the Flash chip, the master MCU controls the slave MCU to be powered on, so that the slave MCU can send firmware data request to the master MCU.

The slave MCU sends a request for reading firmware data to the master MCU.

Wherein, the firmware data of the master MCU and the slave MCU is pre-stored in the Flash chip and the storage locations thereof in the Flash chip are different. The firmware data request comprises the storage addresses of the firmware data in the Flash chip.

The master MCU receives the request for reading firmware data sent by the slave MCU.

The master MCU functions as a transfer station in the process that the slave MCU acquires the firmware data. The slave MCU sends the request for reading the firmware data to the master MCU, and the master MCU receives the request for reading the firmware data.

The master MCU transmits the request for reading the firmware data to the Flash chip.

The master MCU sends the request for reading the firmware data from the slave MCU to the Flash chip.

The Flash chip returns the requested firmware data to the master MCU.

The Flash chip receives the request for reading the firmware data from the slave MCU transmitted by the master MCU. The firmware data request comprises the storage addresses of the firmware data in the Flash chip. The Flash chip extracts the firmware data according to the storage addresses of the firmware data in the Flash chip, and sends the firmware data to the master MCU.

The master MCU transmits the firmware data to the slave MCU.

The master MCU receives the firmware data sent by the Flash chip, and sends the firmware data to the slave MCU that sends the request for reading the firmware data.

Whether all the slave MCUs read the firmware data is judged.

The slave MCU reads the firmware data sent by the master MCU and enters working state. Judging whether all the slave MCUs read the firmware data is to judge whether all the slave MCUs enter working state.

Firmware data reading of the slave MCU ends.

All the slave MCUs are started after reading the firmware data, that is, the firmware data reading of the slave MCU ends.

The Flash chip in the present disclosure has a larger storage space, and one Flash chip can be used by multiple MCUs, thereby maximizing resource utilization, reducing costs and simplifying circuit.

The above-mentioned embodiments are the preferred embodiments of the present disclosure. Variations and modifications are allowed within the scope of the disclosure. Those skilled in the art will appreciate that the features described above can be combined in various ways to form multiple variations of the disclosure. As a result, such variations fall within the scope of the protection to the present disclosure.

What is claimed is:

1. A firmware boot implementation method based on Flash chip simulation, wherein the method at least comprises:
    when there are at least two MCUs, one of the MCUs is selected as a master MCU and each remaining MCU is as a slave MCU which is connected with the master MCU respectively, and the master MCU is connected with a Flash chip;
    when the master MCU is started, the master MCU is kept in a power-on state, the slave MCU is kept in a power-off state, and the master MCU is started by reading firmware data in the Flash chip;
    when the slave MCU is started, the master MCU controls the slave MCU to be powered on, and the slave MCU sends a request for reading the firmware data to the master MCU;
    the master MCU transmits the request for reading the firmware data from the slave MCU to the Flash chip, and the master MCU transmits the firmware data returned by the Flash chip to the slave MCU, so as to start the slave MCU; and
    wherein the firmware data of the master MCU and the slave MCU are pre-stored in the Flash chip, and the storage locations thereof in the Flash chip are different; the request for reading the firmware data comprises a storage addresses of the firmware data in the Flash chip.

2. The firmware boot implementation method based on Flash chip simulation according to claim 1, wherein the method is applied to start the MCU that needs to be operated after dynamically booting and loading firmware.

3. The firmware boot implementation method based on Flash chip simulation according to claim 1, wherein the firmware data comprises addresses and sizes of the MCUs' firmware set in the Flash chip.

4. The firmware boot implementation method based on Flash chip simulation according to claim 1, wherein the addresses of the firmware data are determined by boot codes fixed in the MCUs.

5. The firmware boot implementation method based on Flash chip simulation according to claim 1, wherein the request for reading the firmware data comprises writing, erasing or reading out the data.

6. The firmware boot implementation method based on Flash chip simulation according to claim 1, wherein the firmware data is burned into the Flash chip, and the firmware data comprises startup codes.

* * * * *